(12) United States Patent
Karjala et al.

US009422425B2

(10) Patent No.: US 9,422,425 B2
(45) Date of Patent: *Aug. 23, 2016

(54) POLYETHYLENE WITH HIGH MELT STRENGTH FOR USE IN FILMS

(75) Inventors: Teresa P. Karjala, Lake Jackson, TX (US); Nicolas Cardoso Mazzola, Jundiai (BR); Mehmet Demirors, Pearland, TX (US); Jorge Caminero Gomes, Sao Paulo (BR); Michael A. Terrasa, Lake Jackson, TX (US)

(73) Assignees: Dow global Technologies LLC, Midland, MI (US); Dow Brasil S.A., Sao Paulo (BR)

( * ) Notice: Subject to any disclaimer, the term of this patent is extended or adjusted under 35 U.S.C. 154(b) by 0 days.

This patent is subject to a terminal disclaimer.

(21) Appl. No.: 13/515,832

(22) PCT Filed: Jan. 11, 2011

(86) PCT No.: PCT/US2011/020846
§ 371 (c)(1),
(2), (4) Date: Jun. 14, 2012

(87) PCT Pub. No.: WO2011/085375
PCT Pub. Date: Jul. 14, 2011

(65) Prior Publication Data
US 2013/0035444 A1 Feb. 7, 2013

Related U.S. Application Data

(63) Continuation-in-part of application No. 12/685,148, filed on Jan. 11, 2010, now Pat. No. 8,653,196.

(51) Int. Cl.
| | | |
|---|---|---|
| *C08L 23/08* | (2006.01) | |
| *C08F 8/32* | (2006.01) | |
| *C08J 5/18* | (2006.01) | |
| *C08F 110/02* | (2006.01) | |
| *C08K 5/3435* | (2006.01) | |

(52) U.S. Cl.
CPC .............. *C08L 23/0815* (2013.01); *C08J 5/18* (2013.01); *C08F 110/02* (2013.01); *C08J 2323/36* (2013.01); *C08K 5/3435* (2013.01); *C08L 2205/025* (2013.01); *Y10T 428/139* (2015.01)

(58) Field of Classification Search
CPC ......... C08J 5/18; C08J 2323/36; C08K 5/17; C08K 5/175; C08K 5/3432; C08K 5/3435; C08K 5/32; C08F 8/30; C08F 8/32; C08F 2500/11; C08L 23/36; C08L 23/0815; C08L 2205/025; C08L 2205/03

USPC ............. 525/333.7, 375, 377, 379, 380, 240
See application file for complete search history.

(56) References Cited

U.S. PATENT DOCUMENTS

| | | | |
|---|---|---|---|
| 3,709,853 A | 1/1973 | Karapinka | |
| 4,339,507 A | 7/1982 | Kurtz | |
| 4,390,666 A | 6/1983 | Moriguchi et al. | |
| 4,409,367 A | 10/1983 | Beijleveld et al. | |
| 4,603,173 A | 7/1986 | Mack et al. | |
| 5,091,228 A * | 2/1992 | Fujii et al. ................... | 428/34.3 |
| 5,486,575 A | 1/1996 | Shroff | |
| 5,539,075 A | 7/1996 | Gustafsson et al. | |
| 5,685,128 A | 11/1997 | Chum et al. | |
| 6,521,338 B1 | 2/2003 | Maka | |
| 6,608,000 B1 * | 8/2003 | Bamberger et al. .......... | 502/113 |
| 6,706,822 B2 | 3/2004 | Guenther et al. | |
| 6,765,048 B2 | 7/2004 | Dohrer | |
| 6,984,698 B2 | 1/2006 | McLeod et al. | |
| 7,579,411 B2 | 8/2009 | Roth et al. | |
| 8,039,554 B2 | 10/2011 | Iseki | |
| 8,653,196 B2 | 2/2014 | Mazzola | |
| 8,664,337 B2 * | 3/2014 | Mazzola et al. .............. | 525/194 |
| 2003/0216494 A1 * | 11/2003 | Roth et al. ...................... | 524/95 |
| 2003/0236328 A1 | 12/2003 | McLeod et al. | |
| 2005/0197433 A1 | 9/2005 | Roth et al. | |
| 2006/0040121 A1 * | 2/2006 | Poloso et al. ................. | 428/516 |
| 2008/0199673 A1 | 8/2008 | Allgeuer et al. | |
| 2009/0209158 A1 | 8/2009 | Richeson et al. | |
| 2010/0210800 A1 | 8/2010 | Roth et al. | |
| 2011/0003940 A1 | 1/2011 | Karjala et al. | |
| 2011/0171407 A1 | 7/2011 | Mazzola | |
| 2012/0283390 A1 | 11/2012 | Demirors et al. | |
| 2013/0035444 A1 | 2/2013 | Karjala et al. | |

FOREIGN PATENT DOCUMENTS

| | | | |
|---|---|---|---|
| EP | 0056674 A1 | 7/1982 | |
| EP | 1229053 A2 | 8/2002 | |
| JP | S58194904 A | 11/1983 | |
| WO | 0190113 A1 | 11/2001 | |
| WO | WO02092653 A1 | 11/2002 | |

(Continued)

OTHER PUBLICATIONS http://en.wikipedia.org/wiki/Low-density_polyethylene; 2014.*
http://en.wikipedia.org/wiki/Linear_low-density_polyethylene; 2014.*
http://en.wikipedia.org/wiki/Medium_density_polyethylene; 2013.*
Scafforo R, et al, On the Effectiveness of Different Additives and Concentrations on the Re-Building of the Molecular Structure of Degraded Polyethylene, Polymer Degradation and Stability, Dec. 2006 vol. 91, No. 12, 1 XP025095966.

(Continued)

*Primary Examiner* — Roberto Rabago

(57) ABSTRACT

The present invention is a method for producing a film particularly well suited for shrink film applications, said method comprising the steps of selecting a target polyethylene resin and then increasing the melt strength of the polyethylene resin by reacting the polyethylene resin with an alkoxy amine derivative, and then forming a film from the reacted target polyethylene.

16 Claims, No Drawings

(56) References Cited

FOREIGN PATENT DOCUMENTS

| WO | 2005/090419 | A1 | 9/2005 |
|---|---|---|---|
| WO | 2007/024447 | A1 | 3/2007 |
| WO | 2007145713 | A1 | 12/2007 |

OTHER PUBLICATIONS

Scaffaro R, et al, Effect of the Additive Level and of the Processing Temperature on the Re-Building of Post-Consumer Pipes from Polyethylene Blends, European Polymer Journal, pp. 2947-2955, 2007, XP002633405.
La Mantia, FP, et al, Processability and Properties of Re-Graded, Photo-Oxidized Post-Consumer Greenhouse Films, Macromolecular Materials and Engineering, XP002633361, 2005.
La Mantia FP, et al., Re-Gradation of Photo-Oxidized Post-Consumer Greenhouse Films, Macromolecular Rapid Communications, XP002633780, 2005.
Reach EN CLP Stoffenchecker, Octadecanoic Acid, XP002633360.
PCT/US2011/020846, International Search Report, May 2011.
PCT/US2011/020846, Written Opinion of the International Searching Authority, May 2011.
International Preliminary Report on Patentability for International Application PCT/US2011/020839, International Filing Date Jan. 11, 2011, Mail Date Apr. 30, 2013, 8 pages.
International Preliminary Report on Patentability for International Application PCT/US2011/020850, International Filing Date Jan. 11, 2011, Mail Date Jul. 17, 2012, 8 pages.
International Preliminary Report on Patentability for International Application PCT/US2011/020853; International Filing Date Jan. 11, 2011, Mail Date Jul. 17, 2012, 8 pages.
International Search Report for International Application PCT/US2011/020839, International Filing Date Jan. 11, 2011, Mail Date May 3, 2011, 5 pages.
International Search Report for International Application PCT/US2011/020850, International Filing Date Jan. 11, 2011, Mail Date May 3, 2011, 3 pages.
International Search Report for International Application PCT/US2011/020853; International Filing Date Jan. 11, 2011, Mail Date May 3, 2011, 4 pages.
Lupolen 1812 E LDPE; http://www.matweb.com/search/datasheet.aspx?matguid=9ae232a113dc459a88faf7606b7c4ade; Date Apr. 2012.
Purell GB7250 HDPE; https://polymers.lyondellbasell.com/portal/binary/com.vignette.vps.basell.productgrade.productgrade-filedisplay?id=e4e5a91b51980110VgnVCM1000000646f3c14 RCRD&type=iso; Date Apr. 2012.
Written Opinion for International Application PCT/US2011/020839, International Filing Date Jan. 11, 2011, Mail Date May 3, 2011, 7 pages.
Written Opinion for International Application PCT/US2011/020850, International Filing Date Jan. 11, 2011, Mail Date May 3, 2011, 7 pages.
Written Opinion for International Application PCT/US2011/020853; International Filing Date Jan. 11, 2011, Mail Date May 3, 2011, 7 pages.

* cited by examiner

POLYETHYLENE WITH HIGH MELT STRENGTH FOR USE IN FILMS

CROSS-REFERENCE TO RELATED APPLICATIONS

This application claims priority continuation-in-part from U.S. patent application Ser. No. 12/685,148, filed Jan. 11, 2010 now U.S. Pat. No. 8,653,196, the disclosure of which is incorporated herein by reference for purposes of U.S. practice.

FIELD OF THE INVENTION

The present invention generally pertains to ethylene/alpha-olefin interpolymer resins that can make films with improved optical properties (haze, gloss, and/or clarity), good mechanical properties (tear and puncture), and high shrinkage (shrink tension) which create high value films especially for shrink applications, such as collation shrink films.

BACKGROUND AND SUMMARY OF THE INVENTION

Polyethylene has desirable properties that have helped to make it the highest volume polymer manufactured. Polyethylene can be made in different processes in order to give different properties. Known families of polyethylene include high density polyethylene (HDPE), linear low density polyethylene (LLDPE), and low density polyethylene made using high pressure reactors (LDPE). Within these broad classes many variations exist resulting from different types of polyolefin process technologies (for example, solution, slurry or gas phase) or from the use of different catalysts (for example, Ziegler-Natta or constrained geometry catalysts). The desired application requires a careful balance of rheological properties which will lead a person of skill in the art to select one type of polyethylene over another. In many applications, such as blow-molding and blown film applications, melt strength of the polyethylene is a key parameter.

The melt strength is a practical measurement that can predict material performance. In melt processing, good melt strength is important to maintain stability during processes such as coating, blown film production, fiber spinning and foamed parts.

Melt strength is related to several processing parameters such as bubble stability and therefore thickness variation during blown film production; parison formation during blow molding; sagging during profile extrusion; cell formation during foaming; more stable thickness distribution during sheet/film thermoforming.

This property can be enhanced by using resins with higher molecular weight, but such resins will generally require more robust equipment and more energy use because they tend to generate higher extrusion pressure during the extrusion process. Therefore, properties must be balanced to provide an acceptable combination of physical properties and processability.

The present invention generally pertains to ethylene/alpha-olefin interpolymer resins that can make films with improved optical properties (haze, gloss, and/or clarity), good mechanical properties (tear and puncture), and high shrinkage (shrink tension) which create high value especially for shrink films, such as collation shrink films. Additionally, a high modulus is advantageous. It is difficult to obtain a balance of these properties with one resin. For instance, high shrinkage may be obtained by a very high molecular weight. This high molecular weight, however, often results in poor optical properties as very high molecular weight materials tend to be highly elastic and upon extrusion create a high surface roughness on the film leading to lower optical properties. Another example is that generally to increase the modulus the density is increased. When the density is increased, however, the puncture properties generally decrease.

Additionally, this invention allows for the use of an existing polyethylene resin, which when reacted with an alkoxy amine derivative, is even more suitable for shrinkage films due to lower melt index ($I_2$ or MI), higher melt strength, higher Viscosity Ratios, and higher melt index ratios ($I_{10}/I_2$).

The ethylene/alpha-olefin interpolymer of the present invention provides good properties (such as optical, tear, puncture, shrinkage, and modulus) without any one of such properties being unduly negatively impacted. The present invention is a new process for increasing the melt strength of polyethylene involving reacting molten polyethylene with an alkoxyamine derivative through regular extrusion processing. Accordingly, one aspect of the invention is a method for increasing the melt strength of a polyethylene resin comprising first selecting a polyethylene resin having a density, as determined according to ASTM D792, in the range of from 0.90 g/cm³ to 0.955 g/cm³, and a melt index, as determined according to ASTM D1238 (2.16 kg, 190° C.), in the range of from 0.01 g/10 min to 10 g/10 min and then reacting an alkoxy amine derivative with the polyethylene resin in an amount and under conditions sufficient to increase the melt strength of the polyethylene resin.

The present invention is a new process for increasing the melt strength of polyethylene involving reacting molten polyethylene with an alkoxyamine derivative through regular extrusion processing. Accordingly, one aspect of the invention is a method for increasing the melt strength of a polyethylene resin comprising first selecting a polyethylene resin having a density, as determined according to ASTM D792, in the range of from 0.90 g/cm³ to 0.955 g/cm³, and a melt index, as determined according to ASTM D1238 (2.16 kg, 190° C.), in the range of from 0.01 g/10 min to 10 g/10 min and then reacting an alkoxy amine derivative with the polyethylene resin in an amount and under conditions sufficient to increase the melt strength of the polyethylene resin.

The present invention may also increase the Viscosity Ratio of the resin, indicating good processability.

DETAILED DESCRIPTION OF THE INVENTION

In its broadest sense, the present invention is a method for producing improved films suitable for shrink applications in which the method involves increasing the melt strength of a target polyethylene resin. Polyethylene resin includes all polymers or polymer blends which are derived at least 50% by weight from ethylene monomer units. This includes materials known in the art as high density polyethylene (HDPE), linear low density polyethylene (LLDPE), and low density polyethylene made using high pressure reactors (LDPE).

The target polyethylene resin selected should have a density, as determined according to ASTM D792, in the range of from 0.90 g/cm³ to 0.955 g/cm³, more preferably from 0.92 g/cm³ to 0.94 g/cm³, still more preferably from 0.923 g/cm³ to 0.935 g/cm³ and a melt index, as determined according to ASTM D1238 (2.16 kg, 190° C.), in the range of from 0.01 g/10 min to 10 g/10 min, more preferably 0.1 g/10 min to 7 g/10 min. Suitable polyethylene resins can be produced with conventional Ziegler Natta or Chromium catalysts but also with metallocene or single site catalysts. Such resins may have monomodal or multimodal molecular weight distributions.

The target polyethylene has a molecular weight distribution, $M_w/M_n$, of less than about 5. The melt flow ratio of $I_{10}/I_2$ of the target polyethylene is greater than 9. A viscosity ratio [Viscosity at 0.1 rad/s]/[Viscosity at 100 rad/s] of the target polyethylene measured at 190° C. is greater than 8. Tan delta at 0.1 rad/s of the target polyethylene measured at 190° C. is less than 4. Melt strength of the target polyethylene measured as the plateau force (cN) at 190° C. is greater than 5. The gpc BR of the target polyethylene is greater than 0.03.

Once the target polyethylene resin is selected, it is reacted with an alkoxy amine derivative. For purposes of the present invention "alkoxy amine derivatives" includes nitroxide derivatives. The alkoxy amine derivative is added in an amount and under conditions sufficient to increase the melt strength of the polyethylene resin. The alkoxy amine derivatives correspond to the formula:

$(R_1)(R_2)N-O-R_3$ where $R_1$ and $R_2$ are each independently of one another, hydrogen, $C_4$-$C_{42}$ alkyl or $C_4$-$C_{42}$ aryl or substituted hydrocarbon groups comprising O and/or N, and where $R_1$ and $R_2$ may form a ring structure together; and where $R_3$ is hydrogen, a hydrocarbon or a substituted hydrocarbon group comprising O and/or N. Preferred groups for $R_3$ include —$C_1$-$C_{19}$alkyl; —$C_6$-$C_{10}$aryl; —$C_2$-$C_{19}$akenyl; —O—$C_1$-$C_{19}$alkyl; —O—$C_6$-$C_{10}$aryl; —NH—$C_1$-$C_{19}$alkyl; —NH—$C_6$-$C_{10}$aryl; —N—($C_1$-$C_{19}$alkyl)$_2$. $R_3$ most preferably contains an acyl group. The preferred compound may form nitroxylradical (R1)(R2)N—O* or amynilradical (R1)(R2)N* after decomposition or thermolysis.

A particularly preferred species of alkoxy amine derivative is 9-(acetyloxy)-3,8,10-triethyl-7,8,10-trimethyl-1,5-dioxa-9-azaspiro[5.5]undec-3-yl]methyl octadecanoate which has the following chemical structure:

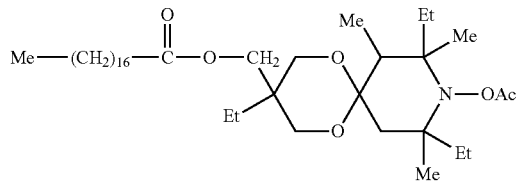

Examples of some preferred species for use in the present invention include the following:

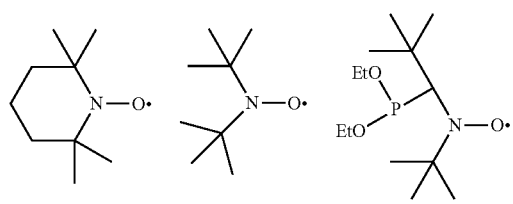

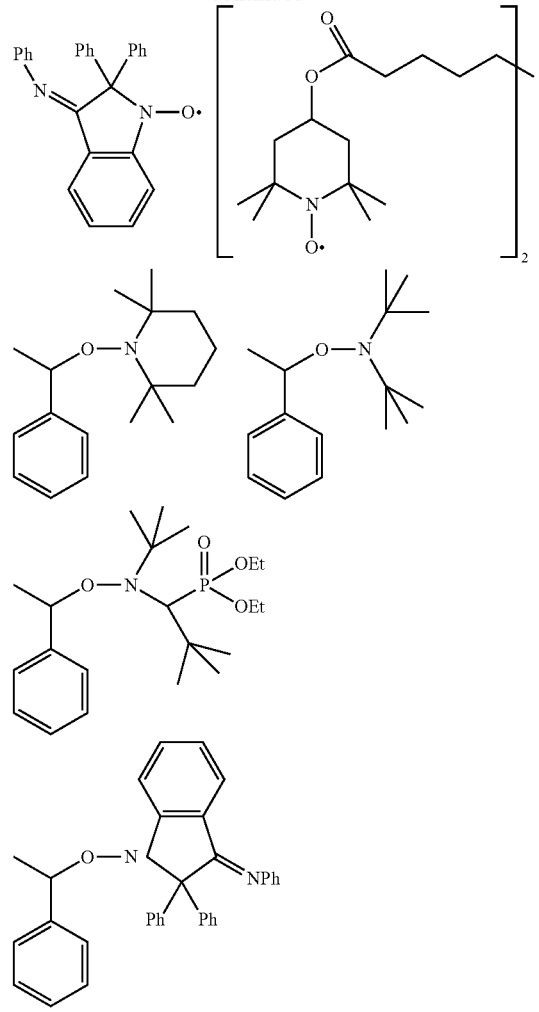

In general hydroxyl amine esters are more preferred with one particularly favored hydroxyl amine ester being 9-(acetyloxy)-3,8,10-triethyl-7,8,10-trimethyl-1,5-dioxa-9-azaspiro[5.5]undec-3-yl]methyl octadecanoate.

The alkoxy amine derivatives are added in an amount sufficient to increase the melt strength and/or increase the elongational viscosity to the desired level. In general the alkoxy amine derivatives are added in an amount of from 1 to 900 ppm of the total amount of polyethylene polymer by weight (that is from 1 to 900 parts alkoxy amine derivative per million parts (by weight) of target resin plus carrier resin, if any), more preferably from 15 to 600 ppm, more preferably from 25 to 400 ppm and still more preferably from 30 to 200 ppm.

The addition to the polyethylene polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing. Particularly preferred processing machines are single-screw extruders, contra rotating and co rotating twin-screw extruders, planetary-gear extruders, ring extruders or cokneaders. It is also possible to use processing machines provided with at least one gas removal compartment to which a vacuum can be applied. Suitable extruders and kneaders are described, for example, in Handbuch der Kunststoftextrusion, Vol 1 Grundlagen, Editors F. Hensen, W. Knappe, H. Potente, 1989, pp. 3-7, ISBN.3-446-14339-4 (Vol 2 Extrusionsanlagen 1986, ISBN 3-446-14329-7). For example, the screw length can be 1-60 times the screw diameter, preferably 35-48 times the screw diameters. The rotational speed of the screw is preferably 10-600 rotations per minute (rpm), more preferably 25-300 rpm. It is also possible to first prepare a concentrated mixture of the additive in a carrier polyethylene resin, preferably at 1,000 to 10,000 ppm, and then introduce this concentrate or "masterbatch" via an extruder into a melted polyethylene using a static mixer to blend the two materials, preferably at 1 to 20 wt % of the concentrate in the melted resin. The concentrate could be processed in an extruder, preferably at temperatures from 180 to 220° C. The temperatures in the static mixer could range from 200 to 250° C., with a residence time in the mixer ranging from 1 to 10 minutes.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The polymers need to be subjected to an elevated temperature for a sufficient period of time, so that the desired changes occur. The temperature is generally above the softening point of the polymers. In a preferred embodiment of the process of the present invention, a temperature range lower than 280° C., particularly from about 160° C. to 280° C. is employed. In a particularly preferred process variant, the temperature range from about 200° C. to 270° C. is employed.

The period of time necessary for reaction can vary as a function of the temperature, the amount of material to be reacted and the type of, for example, extruder used. It is usually from about 10 seconds to 30 minutes, in particular from 20 seconds to 20 minutes.

The alkoxy amine derivative can advantageously be added to the mixing device by use of a masterbatch. As will be appreciated by those of ordinary skill in the art, the carrier resin for the masterbatch should be chosen to be compatible with the resin to be modified. LDPE high pressure low density polyethylene polymers (referred to in the industry as "LDPE") were unexpectedly found to be the preferred carrier due to the lower reactivity as evidenced by little variation of the extrusion pressure during masterbatch production. HDPE may be a better carrier as it will react even less because it does not have tertiary carbons and very low vinyls. Another advantage of this invention is the discovery that polypropylene is not a good carrier for this additive, as it tends to degrade at typical processing temperatures. Another discovery is that the carrier resin should be substantially free of any antioxidant additives, meaning that the carrier resin should preferably have less than 1,000 ppm of antioxidant additives, preferably less than 500 ppm and more preferably less than 100 ppm by weight, as antioxidants tend to suppress the activity of the additive.

The preferred carrier resin should be compatible with the application at hand; it should have similar viscosity with the target polyethylene resin with which it is going to be blended. It should be preferably an LDPE or HDPE resin with minimal trisubstituted unsaturation units, preferably fewer than 70 per 1,000,000 carbon atoms. The preferred carrier resin should have a molecular weight (Mn) that is less than 50,000 so that it is easy to process, as demonstrated by the pressure drop through the extruder. The carrier resin could incorporate other additives for processing aids but it should be substantially free of antioxidant compounds, preferably containing less than 1,000 ppm, more preferably less than 500 ppm and still more preferably less than 100 ppm by weight, of any antioxidant compound.

The target polyethylene resin could be a copolymer of ethylene with any alkene monomer containing 3 to 12 carbons. Preferably, the target polyethylene resin should have a level of trisubstituted unsaturations units per 1,000,00 carbon atoms in the range of from 200 to 450. It should have a molecular weight slightly lower than the carrier resin, as measured by the melt index (g/10 min). Preferably, the melt index of the polyethylene resin should be higher by 0.2-0.5 units (g/10 min) than the final desired resin. Preferably, the polyethylene resin should contain minimal or no antioxidant additives, and any additives should be well-dispersed in the resin prior to being blended with the carrier resin.

The amount of the alkoxy amine derivative material in the carrier resin should be in the range of 0.1 to 30% by weight, preferably from 0.1 to 5%, and more preferably in the range of 0.2 to 1%. The amount of the masterbatch is added so that the alkoxy amine derivative is added to the target product is in the range of 1 to 900 ppm, more preferably from 15 to 600 ppm, more preferably from 25 to 400 ppm and still more preferably from 30 to 200 ppm. It will be readily understood by one of ordinary skill in the art that the amount of alkoxy amine derivative in the final product will be reduced from the added amounts, as the compound reacts with the target and carrier polyethylene.

Preferably, the amount of the alkoxy amine derivative should be kept below about 100 ppm to minimize reaction in the carrier resin, reduce the potential for gels in the final product, and be substantially reacted out in the final product so that the final product remains stable with further processing. It should be understood that after the alkoxy amine derivative has been allowed to react with the target resin, it may be desirable to add one or more antioxidant additives, to protect the properties of the modified target resin. One way to accomplish this is to blend the resin after reaction with the alkoxy amine derivative with another resin that is rich in antioxidants.

Blend

The target polyethylene for use in the present invention may advantageously be a blend of two or more polymers, for example a linear low density polyethylene blended with a high pressure low density polyethylene (LDPE) composition. Such low density polyethylene composition may have a density in the range of from 0.910 g/cm$^3$ to 0.940 g/cm$^3$; for example, from 0.915 g/cm$^3$ to 0.935 g/cm$^3$, and a melt index ($I_2$) in the range of from 0.1 to 5 g/10 minutes; for example, from 0.2 to 2 g/10 minutes. The overall blend of the target resin before reacting with the alkoxy amine derivative may have a density in the rage of from 0.910 g/cm$^3$ to 0.940 g/cm$^3$; for example, from 0.915 g/cm$^3$ to 0.935 g/cm$^3$, and a melt index ($I_2$) in the range of from 0.01 to 5 g/10 minutes; for example, from 0.1 to 3 g/10 minutes. Alternatively the target resin (which may itself be a blend) may first be reacted with the alkoxy amine derivative and then blended with one or more additional polymers.

Film Application

The inventive polyethylene or blend thereof with one or more other polymers, for example LDPE, may advantageously be used to manufacture films. Such films may include, but are not limited to, clarity shrink films, collation shrink films, cast stretch films, silage films, stretch hooder films, sealants, stand up pouch films, liner films, machine direction oriented films, and diaper backsheets. Different methods may be employed to manufacture such films. Suitable conversion techniques include, but are not limited to, blown film process, cast film process, tenter frame process, double bubble process, such as partially crosslinked or non-crosslinked, vertical or horizontal form fill and seal process. Such techniques are generally well known. In one embodiment, the conversion technique includes, but is not limited to, the blown film process.

The films according to the present invention may include at least one film layer, such as a monolayer film, or at least one layer in a multilayer film prepared by cast, blown, calendered, or extrusion coating processes. The reacted target polyethylene or a blend thereof with one or more other polymers, for example LDPE, may be used in a variety of films, including but not limited to clarity shrink films, collation shrink films, cast stretch films, silage films, stretch hooder films, sealants, stand up pouch films, liner films, machine direction oriented films, and diaper backsheets.

The film has a MD shrink tension of greater than 20 cN and a haze of less than 15%. The film has MD tear greater than 100 g and a CD tear greater than 700 g.

Testing Methods

Also disclosed is a film comprising: a) from 10 to 90 percent by weight of a polyethylene polymer made by the process of: i) selecting a target polyethylene resin having a density, as determined according to ASTM D792, in the range of from 0.90 g/cm$^3$ to 0.955 g/cm$^3$, and a melt index, as determined according to ASTM D1238 (2.16 kg, 190° C.), in the range of from 0.01 g/10 min to 10 g/10 min; ii) reacting said target polyethylene with an alkoxy amine derivative in an amount less than 900 parts derivative per million parts by weight of total polyethylene resin under conditions sufficient to increase the melt strength of the target polyethylene resin; and b) from 10 to 90 percent by weight of a low density polyethylene composition.

Melt Strength

Melt strength measurements are conducted on a Gottfert Rheotens 71.97 (Göettfert Inc.; Rock Hill, S.C.), attached to a Gottfert Rheotester 2000 capillary rheometer. The melted sample (about 25 to 30 grams) is fed with a Goettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die, with an acceleration of 2.4 mm/s$^2$. The tensile force is recorded as a function of the take-up speed of the nip rolls. Melt strength is reported as the plateau force (cN) before the strand breaks. The following conditions are used in the melt strength measurements: plunger speed=0.265 mm/second; wheel acceleration=2.4 mm/s$^2$; capillary diameter=2.0 mm; capillary length=30 mm; and barrel diameter=12 mm.

Melt Index

Melt index, or $I_2$, is measured in accordance with ASTM D 1238-10, Condition 190° C./2.16 kg, and is reported in grams eluted per 10 minutes. The $I_{10}$ is measured in accordance with ASTM D 1238, Condition 190° C./10 kg, and is reported in grams.

Density

Samples for density measurements are prepared according to ASTM D 4703-10. Samples are pressed at 374° F. (190° C.) for five minutes at 10,000 psi (68 MPa). The temperature is maintained at 374° F. (190° C.) for the above five minutes, and then the pressure is increased to 30,000 psi (207 MPa) for three minutes. This is followed by one minute hold at 70° F. (21° C.) and 30,000 psi (207 MPa). Measurements are made within one hour of sample pressing using ASTM D792-08, Method B.

Dynamic Mechanical Spectroscopy

Resins are compression-molded into "3 mm thick×1 inch" circular plaques at 350° F. for five minutes, under 1500 psi pressure in air. The sample is then taken out of the press, and placed on the counter to cool.

A constant temperature frequency sweep is performed using a TA Instruments "Advanced Rheometric Expansion System (ARES)," equipped with 25 mm (diameter) parallel plates, under a nitrogen purge. The sample is placed on the plate, and allowed to melt for five minutes at 190° C. The plates are then closed to a gap of 2 mm, the sample is trimmed (extra sample that extends beyond the circumference of the "25 mm diameter" plate is removed), and then the test is started. The method has an additional five minute delay built in, to allow for temperature equilibrium. The experiments are performed at 190° C. over a frequency range of 0.1 to 100 rad/s. The strain amplitude is constant at 10%. The stress response is analyzed in terms of amplitude and phase, from which the storage modulus (G'), loss modulus (G"), complex modulus (G*), complex viscosity η*, tan (δ) or tan delta, viscosity at 0.1 rads (V0.1), the viscosity at 100 rads (V100), and the Viscosity Ratio (V0.1/V100) are calculated.

Triple Detector Gel Permeation Chromatography (TDGPC)—Conventional GPC, Light Scattering GPC, and gpcBR For the GPC techniques used herein (Conventional GPC, Light Scattering GPC, and gpcBR), a Triple Detector Gel Permeation Chromatography (3D-GPC or TDGPC) system is used. This system consists of a Waters (Milford, Mass.) model 150C High Temperature Chromatograph (other suitable high temperatures GPC instruments include Polymer Laboratories (Shropshire, UK) Model 210 and Model 220), equipped with a Precision Detectors (Amherst, Mass.) 2-angle laser light scattering (LS) detector Model 2040, an IR4 infra-red detector from Polymer ChAR (Valencia, Spain), and a Viscotek (Houston, Tex.) 150R 4-capillary solution viscometer (DP).

A GPC with these latter two independent detectors and at least one of the former detectors is sometimes referred to as "3D-GPC" or "TDGPC," while the term "GPC" alone generally refers to conventional GPC. Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

The eluent from the GPC column set flows through each detector arranged in series, in the following order: LS detector, IR4 detector, then DP detector. The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below in the paragraph following Equation (5).

Suitable high temperature GPC columns can be used, such as four 30 cm long Shodex HT803 13 micron columns, or four 30 cm Polymer Labs columns of 20-micron mixed-pore-size packing (MixA LS, Polymer Labs). Here, the MixA LS columns are used. The sample carousel compartment is operated at 140° C., and the column compartment is operated at 150° C. The samples are prepared at a concentration of "0.1 grams of polymer in 50 milliliters of solvent." The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are gently stirred at 160° C. for four hours. The injection volume is 200 microliters. The flow rate through the GPC is set at 1 ml/minute.

Conventional GPC

For Conventional GPC, the IR4 detector is used, and the GPC column set is calibrated by running 21 narrow molecular weight distribution polystyrene standards. The molecular weight (MW) of the standards ranges from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to or greater than 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing highest molecular weight component to minimize degradation. The polystyrene standard peak molecular weights are converted to polyethylene molecular weight using Equation (1) (as described in Williams and Ward, J. Polym. Sci., Polym. Letters, 6, 621 (1968)):

$$M\text{polyethylene} = A \times (M\text{polystyrene})^B \quad \text{(Eq. 1)},$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as outlined in the section on Light Scattering (LS) GPC below in the paragraph following Equation (5). Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{CC} = \sum_i \left( \frac{C_i}{\sum_i C_i} \right) M_i = \sum_i w_i M_{cc,i} \quad \text{(Eq. 2)}$$

$$M_{n,cc} = \Sigma w_i / \Sigma (w_i / M_{cc,i}) \quad \text{(Eq. 3)}$$

$$M_{z,cc} = \Sigma (w_i M_{cc,i}^2) / \Sigma (w_i M_{cc,i}) \quad \text{(Eq. 4)}$$

Light Scattering (LS) GPC

For the LS GPC, the Precision Detector PD12040 detector Model 2040 is used. Depending on the sample, either the 15° angle or the 90° angle of the light scattering detector is used for calculation purposes. Here, the 15° angle was used.

The molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used in the determination of the molecular weight is obtained from the mass detector area, and the mass detector constant derived from a suitable linear polyethylene homopolymer, or one of the polyethylene standards of known weight average molecular weight. The calculated molecular weights are obtained using a light scattering constant derived from one or more of the polyethylene standards mentioned below and a refractive index concentration coefficient, dn/dc, of 0.104. Generally, the mass detector response and the light scattering constant should be determined from a linear standard with a molecular weight in excess of about 50,000 g/mole. The viscometer calibration can be accomplished using the methods described by the manufacturer, or, alternatively, by using the published values of suitable linear standards such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight average molecular weight ("Mw, Abs") is determined using Equation (5) below, using the "peak area" method for higher accuracy and precision. The "LS Area" and the "Conc. Area" are generated by the chromatograph/detectors combination.

$$M_w = \sum_i w_i M_i = \quad \text{(Eq. 5)}$$

$$\sum_i \left( \frac{C_i}{\sum_i C_i} \right) M_i = \frac{\sum_i C_i M_i}{\sum_i C_i} = \frac{\sum_i LS_i}{\sum_i C_i} = \frac{LS \text{ Area}}{\text{Conc. Area}}$$

For each LS profile, the x-axis (log MWcc-CPC), where cc refers to the conventional calibration curve, is determined as follows. First, the polystyrene standards (see above) are used to calibrate the retention volume into "log $MW_{PS}$." Then, Equation 1 (Mpolyethylene=A×(Mpolystyrene)$^B$) is used to convert "log $MW_{PS}$" to "log $MW_{PE}$." The "log $MW_{PE}$" scale serves as the x-axis for the LS profiles of the experimental section (log $MW_{PE}$ is equated to the log MW(cc-CPC)). The y-axis for each LS profile is the LS detector response normalized by the injected sample mass. Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume.

In the low molecular weight region of the GPC elution curve, when the presence of a significant peak that is known to be caused by the presence of anti-oxidant or other additives, the presence of such peak will cause an underestimation of the number average molecular weight (Mn) of the polymer sample to give a overestimation of the sample polydispersity defined as Mw/Mn, where Mw is the weight average molecular weight. The true polymer sample molecular weight distribution can therefore be calculated from the GPC elution by excluding this extra peak. This process is commonly described as the peak skim feature in data processing procedures in liquid chromatographic analyses. In this process, this additive peak is skimmed off from the GPC elution curve before the sample molecular weight calculation is performed from the GPC elution curve.

gpcBR Branching Index by Triple Detector GPC (3D-GPC)

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants. Upon obtaining the constants, the two values are used to construct two linear reference conventional calibrations for polyethylene molecular weight and polyethylene intrinsic viscosity as a function of elution volume, as shown in Equations (6) and (7):

$$M_{PE} = \left(\frac{K_{PS}}{K_{PE}}\right)^{\frac{1}{a_{PE}+1}} \cdot M_{PS}^{\frac{a_{PS}+1}{a_{PE}+1}}, \quad (Eq.\ 6)$$

$$[\eta]_{PE} K_{PS} \cdot M_{PS}^{\alpha+1}/M_{PE} \quad (Eq.\ 7).$$

The gpcBR branching index is a robust method for the characterization of long chain branching as described in Yau, Wallace W., "Examples of Using 3D-GPC—TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equations (8). The area calculation in Equation (5) and (8) offers more precision, because, as an overall sample area, it is much less sensitive to variation caused by detector noise and 3D-GPC settings on baseline and integration limits. More importantly, the peak area calculation is not affected by the detector volume offsets. Similarly, the high-precision sample intrinsic viscosity (IV) is obtained by the area method shown in Equation (8):

$$IV = [\eta] = \sum_i w_i IV_i = \quad (Eq.\ 8)$$

$$\sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP\ Area}{Conc.\ Area},$$

where DPi stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume, per Equations (2) and (9):

$$[\eta]_{CC} = \sum_i \left(\frac{C_i}{\sum_i C_i}\right) IV_i = \sum_i w_i IV_{cc,i}. \quad (Eq.\ 9)$$

Equation (10) is used to determine the gpcBR branching index:

$$gpcBR = \left[\left(\frac{[\eta]_{CC}}{[\eta]}\right) \cdot \left(\frac{M_w}{M_{w,cc}}\right)^{a_{PE}} - 1\right], \quad (Eq.\ 10)$$

wherein [η] is the measured intrinsic viscosity, $[\eta]_{cc}$ is the intrinsic viscosity from the conventional calibration, Mw is the measured weight average molecular weight, and $M_{w,cc}$ is the weight average molecular weight of the conventional calibration. The weight average molecular weight by light scattering (LS) using Equation (5) is commonly referred to as "absolute weight average molecular weight" or "$M_w$, Abs." The $M_{w,cc}$ from Equation (2) using conventional GPC molecular weight calibration curve ("conventional calibration") is often referred to as "polymer chain backbone molecular weight," "conventional weight average molecular weight," and "$M_{w,GPC}$."

All statistical values with the "cc" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for a and Log K for the determination of gpcBR in this particular case are 0.725 and −3.355, respectively, for polyethylene, and 0.722 and −3.993, respectively, for polystyrene.

Once the K and a values have been determined using the procedure discussed previously, the procedure is repeated using the branched samples. The branched samples are analyzed using the final Mark-Houwink constants as the best "cc" calibration values, and Equations (2)-(9) are applied.

The interpretation of gpcBR is straight forward. For linear polymers, gpcBR calculated from Equation (8) will be close to zero, since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination.

Film Testing

The following physical properties are measured on the films as described in the experimental section.

Total (Overall) Haze and Internal Haze: Internal haze and total haze are measured according to ASTM D 1003-07. Internal haze is obtained via refractive index matching using mineral oil (1-2 teaspoons), which is applied as a coating on each surface of the film. A Hazegard Plus (BYK-Gardner USA; Columbia, Md.) is used for testing. For each test, five samples are examined, and an average reported. Sample dimensions were "6 in×6 in."

45° Gloss: ASTM D2457-08 (average of five film samples; each sample "10 in×10 in").

Clarity: ASTM D1746-09 (average of five film samples; each sample "10 in×10 in").

2% Secant Modulus—MD (machine direction) and CD (cross direction): ASTM D882-10 (average of five film samples in each direction; each sample "1 in×6 in").

MD and CD Elmendorf Tear Strength: ASTM D1922-09 (average of 15 film samples in each direction; each sample "3 in×2.5 in" half moon shape).

MD and CD Tensile Strength: ASTM D882-10 (average of five film samples in each direction; each sample "1 in×6 in").

Dart Impact Strength: ASTM D1709-09 (minimum of 20 drops to achieve a 50% failure; typically ten "10 in×36 in" strips).

Puncture Strength: Puncture is measured on an INSTRON Model 4201 with SINTECH TESTWORKS SOFTWARE Version 3.10. The specimen size is "6 in×6 in," and four measurements are made to determine an average puncture value. The film is conditioned for 40 hours after film production, and at least 24 hours in an ASTM controlled laboratory (23° C. and 50% relative humidity). A "100 lb" load cell is used with a round specimen holder of 4 inch diameter. The puncture probe is a "½ inch diameter" polished stainless steel ball (on a 2.5" rod) with a "7.5 inch maximum travel length."

There is no gauge length, and the probe is as close as possible to, but not touching, the specimen (the probe is set by raising the probe until it touches the specimen). Then the probe is gradually lowered, until it is not touching the specimen. Then the crosshead is set at zero. Considering the maximum travel distance, the distance would be approximately 0.10 inch. The crosshead speed is 10 inches/minute. The thickness is measured in the middle of the specimen. The thickness of the film, the distance the crosshead traveled, and the peak load are used to determine the puncture by the software. The puncture probe is cleaned using a "KIM-WIPE" after each specimen.

Shrink Tension: Shrink tension is measured according to the method described in Y. Jin, T. Hermel-Davidock, T. Karjala, M. Demirors, J. Wang, E. Leyva, and D. Allen, "Shrink Force Measurement of Low Shrink Force Films", SPE ANTEC Proceedings, p. 1264 (2008). The shrink tension of film samples is measured through a temperature ramp test that is conducted on an RSA-III Dynamic Mechanical Analyzer (TA Instruments; New Castle, Del.) with a film fixture. Film specimens of "12.7 mm wide" and "63.5 mm long" are die cut from the film sample, either in the machine direction (MD) or the cross direction (CD), for testing. The film thickness is measured by a Mitutoyo Absolute digimatic indicator (Model C112CEXB). This indicator has a maximum measurement range of 12.7 mm, with a resolution of 0.001 mm. The average of three thickness measurements, at different locations on each film specimen, and the width of the specimen, are used to calculate the film's cross sectional area (A), in which "A=Width×Thickness" of the film specimen is used in shrink film testing. A standard film tension fixture from TA Instruments is used for the measurement. The oven of the RSA-III is equilibrated at 25° C. for at least 30 minutes, prior to zeroing the gap and the axial force. The initial gap is set to 20 mm. The film specimen is then attached onto both the upper and the lower fixtures. Typically, measurements for MD only require one ply film. Because the shrink tension in the CD direction is typically low, two or four plies of films are stacked together for each measurement to improve the signal-to-noise ratio. In such a case, the film thickness is the sum of all of the plies. After the film reaches the initial temperature of 25° C., the upper fixture is manually raised or lowered slightly to obtain an axial force of −1.0 g. This is to ensure that no buckling or excessive stretching of the film occurs at the beginning of the test. Then the test is started. A constant fixture gap is maintained during the entire measurement.

The temperature ramp starts at a rate of 90° C./min, from 25° C. to 80° C., followed by a rate of 20° C./min from 80° C. to 160° C. During the ramp from 80° C. to 160° C., as the film shrinks, the shrink force, measured by the force transducer, is recorded as a function of temperature for further analysis. The difference between the "peak force" and the "baseline value before the onset of the shrink force peak" is considered the shrink force (F) of the film. The shrink tension of the film is the ratio of the shrink force (F) to the cross sectional area (A) of the film.

EXPERIMENTAL

The linear low density polyethylene, LLDPE1, used is produced by Ziegler Natta catalysis and is a 1 melt index (I2 or MI), 0.926 g/cm$^3$ density, with additives of 1,000 ppm Irgafos 168 (Ciba Specialty Chemicals, Inc., Basel, Switzerland).

Examples are produced from this LLDPE1, extruded with different concentrations of an alkoxy amine derivative additive. The specific additive used is 9-(acetyloxy)-3,8,10-triethyl-7,8,10-trimethyl-1,5-dioxa-9-azaspiro[5.5]undec-3-yl]methyl octadecanoate, which is added as an LDPE masterbatch having 5,600 parts additive per million parts by weight LDPE. of the additive (note that the ppm levels reported below refer to the amount of alkoxy amine derivative added and not the amount of the entire masterbatch added).

The masterbatch is prepared as follows: The alkoxy amine derivative additive is compounded with a homopolymer ethylene resin made in a high-pressure tubular reactor (that is, an LDPE resin) having a melt index of 0.7 g/10 min (at 190° C., 2.16 kg ASTM D-1238) and a density of 0.925 g/cm$^3$ (ASTM D792).

The LDPE and derivative are compounded in a 30 mm co-rotating, intermeshing Coperion Werner-Pfleiderer ZSK-30 (ZSK-30) twin screw extruder to form a masterbatch. The ZSK-30 has ten barrel sections with an overall length of 960 mm and a 32 length to diameter ratio (L/D). A two hole strand die is used without a breaker plate or screen pack. The extruder consists of a DC motor, connected to a gear box by V-belts. The 15 HP motor is powered by a GE adjustable speed drive located in a control cabinet. The control range of the screw shaft speed is 1:10. The maximum screw shaft speed is 500 RPM. A pressure transducer is positioned in front of the die to measure die pressure.

The extruder has 8 heated/cooled barrel sections along with a 30 mm spacer, which makes up five temperature controlled zones. It has a cooled only feed section and a heated only die section, which is held together by tie-rods and supported on the machine frame. Each section can be heated electrically with angular half-shell heaters and cooled by a special system of cooling channels.

The screws consist of continuous shafts on which screw-flighted components and special kneading elements are installed in any required order. The elements are held together radially by keys and keyways and axially by a screwed-in screw tip. The screw shafts are connected to the gear-shafts by couplings and can easily be pulled out of the screw barrel for dismantling.

A Conair pelletizer is used to pelletize the blends. It is a 220 volt variable speed, solid cutter unit. The variable speed motor drives a solid machined cutting wheel, which in turn drives a fixed metal roller. A movable rubber roller presses against the fixed roller and helps pull the strands by friction into the cutting wheel. The tension on the movable roller may be adjusted as necessary.

The temperatures are set in the feed zone, 4 zones in the extruder, and the die as:
Feed: 80° C.
Zone 1: 160° C.
Zone 2: 180° C.
Zone 3: 185° C.
Zone 4: 190° C.
Die: 210° C. The screw shaft speed is set at 276 revolutions per minute (RPM), resulting in an output rate of approximately 52 lb/hr.

LLDPE1 and the LDPE/alkoxy amine derivative additive masterbatch are compounded in a 30 mm co-rotating, intermeshing Coperion Werner-Pfleiderer ZSK-30 (ZSK-30) twin screw extruder. The ZSK-30 has ten barrel sections with an overall length of 960 mm and a 32 length to diameter ratio (l/D). A two hole strand die is used without a breaker plate or screen pack. The extruder consists of a DC motor, connected to a gear box by V-belts. The 15 HP motor is powered by a GE adjustable speed drive located in a control cabinet. The control range of the screw shaft speed is 1:10. The maximum screw shaft speed is 500 RPM. A pressure transducer is positioned in front of the die to measure die pressure.

The extruder has 8 heated/cooled barrel sections along with a 30 mm spacer, which makes up five temperature controlled zones. It has a cooled only feed section and a heated only die section, which is held together by tie-rods and supported on the machine frame. Each section can be heated electrically with angular half-shell heaters and cooled by a special system of cooling channels.

The screws consist of continuous shafts on which screw-flighted components and special kneading elements are installed in any required order. The elements are held together radially by keys and keyways and axially by a screwed-in screw tip. The screw shafts are connected to the gear-shafts by couplings and can easily be pulled out of the screw barrel for dismantling.

A Conair pelletizer is used to pelletize the blends. It is a 220 volt variable speed, solid cutter unit. The variable speed motor drives a solid machined cutting wheel, which in turn drives a fixed metal roller. A movable rubber roller presses against the fixed roller and helps pull the strands by friction into the cutting wheel. The tension on the movable roller may be adjusted as necessary.

The temperatures are set in the feed zone, 4 zones in the extruder, and the die as follows:
Feed: 80° C.
Zone 1: 160° C.
Zone 2: 180° C.
Zone 3: 185° C.
Zone 4: 190° C.
Die: 230° C.
The screw shaft speed is set at 325 revolutions per minute (RPM), resulting in an output rate of approximately 40 lb/hr.

LLDPE1 is extruded with masterbatch so that 60 ppm and 120 ppm of the alkoxy amine derivate additive are added. LLDPE1 is also extruded alone. These three samples, along with LLDPE before extrusion are characterized, with the results shown in Table 1. With the addition of the alkoxy amine derivate additive, the melt index decreases, the melt index ratio ($I_{10}/I_2$) increases, the Viscosity Ratio increases, the tan delta decreases, and the melt strength increases as compared to the initial LLDPE1 and the extruded LLDPE1.

TABLE 1

Melt Indexes, DMS Viscosity, Melt strength, and TDGPC data from conventional calibration (cc) and gpcBR of LLDPE1, LLDPE1 Extruded, and LLDPE1 with 60 ppm and 120 ppm alkoxy amine derivate additive.

|  | Comparative Example 4 LLDPE1 | Comparative Example 5 LLDPE1 Extruded | Example 2 LLDPE1 Extruded with 60 ppm alkoxy amine derivative additive | Example 3 LLDPE1 Extruded with 120 ppm alkoxy amine derivative additive |
|---|---|---|---|---|
| I2 (g/10 min) | 1.09 | 0.90 | 0.66 | 0.44 |
| I0 (g/10 min) | 8.51 | 7.67 | 6.45 | 5.53 |
| I10/I2 | 7.83 | 8.53 | 9.76 | 12.50 |
| Visc. 0.1 rad/s (Pa-s) | 7,982 | 10,525 | 14,633 | 25,838 |
| Visc 1 rad/s (Pa-s) | 6,359 | 7,324 | 9,004 | 12,292 |
| Visc. 10 rad/s (Pa-s) | 3,906 | 4,093 | 4,539 | 4,993 |
| Visc. 100 rad/s (Pa-s) | 1,600 | 1,609 | 1,686 | 1,680 |
| Visc. Ratio | 4.99 | 6.54 | 8.68 | 15.38 |
| Tan Delta 0.1 rad/s | 9.09 | 4.98 | 3.39 | 2.01 |
| Melt Strength (cN) | 2.7 | 3.8 | 5.6 | 7.3 |

TABLE 1-continued

Melt Indexes, DMS Viscosity, Melt strength, and TDGPC data from conventional calibration (cc) and gpcBR of LLDPE1, LLDPE1 Extruded, and LLDPE1 with 60 ppm and 120 ppm alkoxy amine derivate additive.

| | Comparative Example 4 LLDPE1 | Comparative Example 5 LLDPE1 Extruded | Example 2 LLDPE1 Extruded with 60 ppm alkoxy amine derivative additive | Example 3 LLDPE1 Extruded with 120 ppm alkoxy amine derivative additive |
|---|---|---|---|---|
| cc-GPC Mn (g/mol) | 26,680 | 26,390 | 26,500 | 25,520 |
| cc-GPC Mw (g/mol) | 106,380 | 106,780 | 109,390 | 102,950 |
| cc-GPC Mz (g/mol) | 319,700 | 316,000 | 335,100 | 290,500 |
| cc-GPC Mw/Mn | 3.99 | 4.05 | 4.13 | 4.03 |
| gpcBR | 0.015 | 0.069 | 0.051 | 0.068 |

Visc. = Viscosity
Visc. Ratio = Viscosity Ratio

Based upon the samples of Table 1, one additional sample is made in order to make film in comparison to other comparative samples of nominal 0.5 melt index ($I_2$=0.5) with application to film for use in collation shrink applications. In this case, 105 ppm alkoxy amine derivative additive is used.

Three other comparative samples are used. Comparative Example 1 is an ethylene/octene LLDPE produced according to U.S. patent application Ser. No. 12/814,902 Filed on Jun. 14, 2010, now abandoned. Comparative Example 2 is an ethylene/octene LLDPE produced according to International Application Number PCT/US10/50745 filed on Sep. 29, 2010. Comparative Example 3 is produced from LLDPE1 and extrusion as described previously, but using 355 ppm of diphenyl oxide bis-sulfonylazide (DPO-BSA) as an additive. This DPO-BSA was a mixture of DPO-BSA/Irganox I-1010 (Ciba Specialty Chemicals, Inc., Basel, Switzerland) in a 1/3.3 ratio.

The characterization results of Example 1 and Comparative Examples 1-3 are shown in Table 2. The densities and $I_2$ melt index of Example 1 and Comparative Examples 1-3 are comparable. The $I_{10}/I_2$, viscosity ratio, and melt strength of Example 1 is the highest, indicating good processability.

Monolayer blown films are made of the samples of Table 2. Monolayer films are also made in a composition of 65 wt % LLDPE (samples of Table 2) and 35 wt % LDPE in which the LDPE used is a high pressure low density polyethylene made by The Dow Chemical Company (LDPE 132I, 0.25 MI, 0.921 g/cm$^3$). For the LLDPE/LDPE blend samples, appropriate quantities are measured out using a laboratory balance. Then, the blended compound, in a large bag with sufficient airspace, is agitated by hand for two minutes until the mixture is homogeneous. This is usually referred to as a "salt and pepper" dry blending technique.

The monolayer blown films are made using multiple extruders (25 mm (E25P×25 L/D), 30 mm (E30P×25 L/D) and 25 mm (E25P×25 L/D)) manufactured by Dr. Collin. Each extruder has a gravimetric feeding system that calculates the output rate. Each extruder has a standard single flight forwarding screw.

The die gap used for all films is 2 mm and the blow up ratio (BUR) is 2.5. Process conditions for the 100% LLDPE samples of Table 2 are shown in Table 3. Process conditions for the 65% LLDPE samples of Table 2 with 35% LDPE 132I are shown in Table 4.

TABLE 2

Melt Indexes, DMS Viscosity, Melt strength, and TDGPC data from conventional calibration (cc) and gpcBR of Example 1 and Comparative Examples 1-3.

| | Example 1 | Comparative Example 1 | Comparative Example 2 | Comparative Example 3 |
|---|---|---|---|---|
| Density (g/cm$^3$) | 0.9267 | 0.9289 | 0.9298 | 0.9266 |
| I2 (g/10 min) | 0.59 | 0.46 | 0.56 | 0.67 |
| I0 (g/10 min) | 6.27 | 4.435 | 3.85 | 6.31 |
| I10/I2 | 10.59 | 9.6 | 6.91 | 9.41 |
| Visc. 0.1 rad/s (Pa-s) | 19,074 | 22973.9 | 12,096 | 16,919 |
| Visc 1 rad/s (Pa-s) | 10,515 | 12214.3 | 9,823 | 9,353 |
| Visc. 10 rad/s (Pa-s) | 4,826 | 5774.54 | 5,852 | 4,580 |
| Visc. 100 rad/s (Pa-s) | 1,708 | 2148.41 | 2,217 | 1,689 |
| Visc. Ratio | 11.17 | 10.69 | 5.46 | 10.02 |
| Tan Delta 0.1 rad/s | 2.64 | 2.80083 | 10.18 | 2.57 |
| Melt Strength (cN) | 7.2 | 5.8 | 4.3 | 6.7 |
| cc-GPC Mn (g/mol) | 25,980 | 35240 | 36,720 | 27,390 |
| cc-GPC Mw (g/mol) | 109,960 | 101610 | 137,000 | 117,350 |
| cc-GPC Mz (g/mol) | 329,700 | 217500 | 355,500 | 377,900 |
| cc-GPC Mw/Mn | 4.23 | 2.88 | 3.73 | 4.28 |
| gpcBR | 0.098 | 0.070 | 0.116 | 0.104 |

Visc. = Viscosity
Visc. Ratio = Viscosity Ratio

TABLE 3

Process conditions for blown films made of Example 1 and Comparative Examples 1-3.

| Sample | Example 1 | Comparative Example 1 | Comparative Example 2 | Comparative Example 3 |
|---|---|---|---|---|
| Target Film Thickness (mil) | 1 | 1 | 1 | 1 |
| Extruder Inside Melt T (° C.) | 185 | 186 | 186 | 185 |
| Extruder Inside Throughput (kg/hr) | 1.9 | 1.9 | 1.9 | 1.9 |
| Extruder Inside RPM | 45 | 45 | 45 | 45 |
| Extruder Core Melt T (° C.) | 183 | 185 | 182 | 185 |
| Extruder Inside Core (kg/hr) | 2 | 1.9 | 1.9 | 2 |
| Extruder Core RPM | 25 | 25 | 25 | 25 |
| Extruder Outside Melt T (° C.) | 187 | 187 | 185 | 185 |
| Extruder Outside Core (kg/hr) | 1.8 | 1.9 | 1.9 | 1.9 |
| Extruder Outside RPM | 45 | 45 | 45 | 45 |
| Takeoff Speed (m/min) | 8.4 | 8.4 | 8.4 | 8.4 |
| Blower (%) | 46 | 46 | 46 | 43 |
| Layflat (cm) | 23.25 | 23.25 | 23.25 | 23.5 |
| Frostline (inches) | 4 | 4 | 4 | 4 |
| Total Throughput (kg/hr) | 5.7 | 5.7 | 5.7 | 5.8 |

TABLE 4

Process conditions for blown films made of 65% of the samples of Table 2 and 35% LDPE 132I.

| Sample | 65% Example 1/ 35% LDPE 132I | 65% Comparative Example 1/ 35% LDPE 132I | 65% Comparative Example 3/ 35% LDPE 132I |
|---|---|---|---|
| Target Film Thickness (mil) | 1.5 | 1.5 | 1.5 |
| Extruder Inside Melt T (° C.) | 185 | 186 | 185 |
| Extruder Inside Throughput (kg/hr) | 2.4 | 2.5 | 2.5 |
| Extruder Inside RPM | 60 | 60 | 60 |
| Extruder Core Melt T (° C.) | 185 | 183 | 184 |
| Extruder Inside Core (kg/hr) | 2.6 | 2.6 | 2.6 |
| Extruder Core RPM | 35 | 35 | 35 |
| Extruder Outside Melt T (° C.) | 187 | 187 | 200 |
| Extruder Outside Core (kg/hr) | 2.5 | 2.5 | 2.6 |
| Extruder Outside RPM | 60 | 60 | 60 |
| Takeoff Speed (m/min) | 7.8 | 8 | 7.8 |
| Blower (%) | 61 | 61 | 59 |
| Layflat (cm) | 23 | 23 | 23.5 |
| Frostline (inches) | 3 | 3 | 3 |
| Total Throughput (kg/hr) | 7.5 | 7.6 | 7.7 |

The properties of the films are measured, with results shown in Table 5 for the 100% LLDPE films and in Table 6 for the 65% LLDPE/35% LDPE 132I films. For the 100% LLDPE films of Table 5, Example 1 shows relatively good optics (high clarity, high gloss, and low haze), similar to that see for LLDPE resins not produced by extrusion with additives, such as Comparative Example 1 and Comparative Example 2. Comparative Example 3, produced by extrusion with a different additive than that of Example 1, shows very poor optics. Other advantages of Example 1 are high MD and CD tear, good dart, and puncture. Example 1 shows the highest MD shrink tension and a high CD shrink tension, indicating that this resin and film would be beneficial in shrink film applications. The films made with Example 1 also show good secant modulus which is also important for shrink film applications.

Table 6 shows for the 65% LLDPE/35% LDPE 132I films similar conclusions as seen with the 100% films. Example 1 has relatively good optics (high clarity, high gloss, and low haze), similar to that see for LLDPE resins not produced by extrusion with additives, such as Comparative Example 1 and Comparative Example 2. The film made with Example 1 has the lowest internal haze. The film made with Comparative Example 3, produced by extrusion with a different additive than that of Example 1, shows very poor optics. Other advantages of the film made with Example 1 are high MD and CD tear, good dart, and puncture. The film made with Example 1 shows the highest MD shrink tension and a high CD shrink tension, indicating that this resin and film would be beneficial in shrink film applications. The films made with Example 1 also show good secant modulus which is also important for shrink film applications.

For the films of Table 5, the MD shrink tension was determined using 1 ply of film and the CD shrink tension was determined using 4 plies of film. For the films of Table 6, the MD shrink tension was determined using 1 ply of film and the CD shrink tension was determined using 2 plies of film.

TABLE 5

Film properties for blown films made of Example 1 and Comparative Examples 1-3.

| | 100% Example 1 | 100% Comparative Example 1 | 100% Comparative Example 2 | 100% Comparative Example 3 |
|---|---|---|---|---|
| Thickness (mil) | 1.01 | 0.95 | 0.94 | 0.95 |
| Density (g/cm$^3$) | 0.9264 | 0.9284 | 0.9274 | 0.9269 |
| I2 | 0.33 | 0.48 | 0.54 | 0.53 |
| I10 | 4.67 | 4.43 | 3.80 | 5.66 |
| I10/I2 | 14.32 | 9.17 | 7.03 | 10.64 |
| Haze Total (%) | 13.6 | 12.2 | 5.5 | 35.3 |
| Haze internal Total (%) | 2.7 | 2.8 | 2.0 | 5.8 |
| 45 Degree Gloss (%) | 42.9 | 48.3 | 72.0 | 15.5 |
| Clarity (%) | 95.7 | 98.6 | 99.5 | 52.9 |
| Tear B CD (g) | 708 | 537 | 523 | 545 |
| Tear B MD (g) | 204 | 143 | 243 | 144 |

TABLE 5-continued

Film properties for blown films made of Example 1 and Comparative Examples 1-3.

| | 100% Example 1 | 100% Comparative Example 1 | 100% Comparative Example 2 | 100% Comparative Example 3 |
|---|---|---|---|---|
| Dart A (g) | 133 | 73 | 160 | 133 |
| Puncture (ft-lb/in$^3$) | 150 | 188 | 293 | 124 |
| 2% Secant Modulus - CD (Psi) | 38,993 | 41,846 | 43,918 | 42,246 |
| 2% Secant Modulus - MD (Psi) | 38,548 | 41,303 | 42,935 | 40,953 |
| CD Break Stress (Psi) | 5,361 | 5,624 | 7,111 | 4,835 |
| CD Strain at Break (%) | 613 | 618 | 619 | 578 |
| CD Strain at Yield | 7 | 8 | 7 | 7 |
| CD Stress at Yield (Psi) | 2,146 | 2,463 | 2,370 | 2,338 |
| MD Break Stress (Psi) | 6,082 | 6,313 | 5,361 | 4,495 |
| MD Strain at Break (%) | 430 | 483 | 436 | 454 |
| MD Strain at Yield | 7 | 9 | 8 | 7 |
| MD Stress at Yield (Psi) | 2,014 | 2,307 | 2,161 | 2,086 |
| MD Shrink Tension (Psi) | 16.95 | 10.43 | 6.94 | 12.81 |
| St. Dev. CD Shrink Tension (Psi) | 1.73 | 1.57 | 1.12 | 0.97 |
| CD Shrink Tension (Psi) | 0.71 | 0.71 | 0.82 | 0.72 |
| St. Dev. MD Shrink Tension (Psi) | 0.15 | 0.16 | 0.33 | 0.39 |

TABLE 6

Film properties for blown films made of 65% of the samples of Table 2 and 35% LDPE 132I.

| | 65% Example 1/35% LDPE 132I | 65% Comparative Example 1/35% LDPE 132I | 65% Comparative Example 3/35% LDPE 132I |
|---|---|---|---|
| Thickness (mil) | 1.46 | 1.44 | 1.41 |
| Density (g/cm$^3$) | 0.92 | 0.93 | 0.92 |
| I2 | 0.24 | 0.31 | 0.33 |
| I10 | 3.72 | 3.53 | 4.29 |
| I10/I2 | 15.41 | 11.45 | 13.20 |
| Haze Total (%) | 12.1 | 9.8 | 22.7 |
| Haze internal Total (%) | 3.0 | 3.5 | 9.0 |
| 45 Degree Gloss (%) | 45.5 | 51.5 | 27.4 |
| Clarity (%) | 89.8 | 94.4 | 74.8 |
| Tear B CD (g) | 778 | 692 | 739 |
| Tear B MD (g) | 131 | 81 | 104 |
| Dart A (g) | 115 | 88 | 124 |
| Puncture (ft-lb/in$^3$) | 128 | 160 | 113 |
| 2% Secant Modulus - CD (Psi) | 40,723 | 44,262 | 41,461 |
| 2% Secant Modulus - MD (Psi) | 34,931 | 40,005 | 36,128 |
| CD Break Stress (Psi) | 4,725 | 5,032 | 5,021 |
| CD Strain at Break (%) | 634 | 665 | 650 |
| CD Strain at Yield | 8 | 8 | 8 |
| CD Stress at Yield (Psi) | 2,073 | 2,306 | 2,080 |
| MD Break Stress (Psi) | 4,395 | 4,855 | 4,321 |
| MD Strain at Break (%) | 338 | 401 | 376 |
| MD Strain at Yield | 7 | 7 | 8 |
| MD Stress at Yield (Psi) | 1,858 | 2,063 | 1,882 |
| MD Shrink Tension (Psi) | 24.79 | 19.56 | 19.43 |
| St. Dev. CD Shrink Tension (Psi) | 1.44 | 0.96 | 19.54 |
| CD Shrink Tension (Psi) | 0.53 | 0.86 | 0.39 |
| St. Dev. MD Shrink Tension (Psi) | 0.09 | 0.14 | 0.49 |

Although the invention has been described in considerable detail through the preceding description and examples, this detail is for the purpose of illustration and is not to be construed as a limitation on the scope of the invention as it is described in the appended claims. All United States patents, published patent applications and allowed patent applications identified above are incorporated herein by reference.

What is claimed is:

1. A method for producing film, said method comprising the steps of:
    a) blending an alkoxy amine derivative with a low density polyethylene to form a masterbatch;
    b) selecting a target polyethylene resin having a density as determined according to ASTM D792, in the range of from 0.92 g/cm$^3$ to 0.94 g/cm$^3$, and a melt index, as determined according to ASTM D1238 (2.16 kg, 190° C.), in the range of from 0.01 g/10 min to 10 g/10 min; where the target polyethylene is a linear low density polyethylene;
    c) blending the masterbatch with the target polyethylene in an amount and under conditions sufficient to increase the melt strength of the polyethylene resin; where the amount of the alkoxy amine derivative is less than 900 parts per million based on a weight of total polyethylene resin; and
    d) blending a composition of c) with 10 to 90 percent by weight of a low density polyethylene composition to form a blend d) that contains the alkoxy amine derivative in an amount of 1 to 400 ppm;
    e) forming a film from the blend d).

2. The method of claim 1 wherein the alkoxy amine derivative corresponds to the formula:

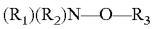

$$(R_1)(R_2)N-O-R_3$$

where $R_1$ and $R_2$ are each independently of one another, hydrogen, $C_4$-$C_{42}$ alkyl or $C_4$-$C_{42}$ aryl or substituted hydrocarbon groups comprising O and/or N, and where $R_1$ and $R_2$ may form a ring structure together; and $R_3$ is hydrogen, a hydrocarbon or a substituted hydrocarbon group comprising O and/or N.

3. The method of claim 1 wherein the alkoxy amine derivative is a hydroxylamine ester.

4. The method of claim 3 wherein the hydroxyl amine ester is hydroxyl amine ester being 9-(acetyloxy)-3,8,10-triethyl-7,8,10-trimethyl-1,5-dioxa-9-azaspiro[5.5]undec-3-yl]methyl octadecanoate.

5. The method of claim 1 wherein the resulting film is a shrink film.

6. A film comprising:
    a) from 10 to 90 percent by weight of a polyethylene polymer made by the process of:

i) selecting a target polyethylene resin having a density, as determined according to ASTM D792, in the range of from 0.92 g/cm$^3$ to 0.94 g/cm$^3$, and a melt index, as determined according to ASTM D1238 (2.16 kg, 190° C.), in the range of from 0.01 g/10 min to 10 g/10 min; where the target polyethylene is a linear low density polyethylene;

ii) blending an alkoxy amine derivative with a low density polyethylene to form a masterbatch;

iii) blending the masterbatch with the target polyethylene in an amount and under conditions sufficient to increase the melt strength of the polyethylene resin, where the amount of the alkoxy amine derivative is less than 900 parts per million based on a weight of total polyethylene resin; and b) adding from 10 to 90 percent by weight of a low density polyethylene composition to a blend obtained in iii) to form a composition that contains the alkoxy amine derivative in an amount of 1 to 400 ppm.

7. The film of claim 6 wherein said target polyethylene has a density in the range of from 0.920 to 0.935 g/cm$^3$.

8. The film of claim 6, wherein said target polyethylene has a melt index in the range of 0.01 to 3 g/10 minutes.

9. The film of claim 6, wherein said target polyethylene has a molecular weight distribution, $M_w/M_n$, of less than about 5.

10. The film of claim 6, wherein said film has a MD shrink tension of greater than 20 cN and a haze of less than 15%.

11. The film of claim 6, wherein said film has MD tear greater than 100 g and a CD tear greater than 700 g.

12. The film of claim 6, wherein the melt flow ratio of $I_{10}/I_2$ of the target polyethylene is greater than 9.

13. The film of claim 6, wherein [Viscosity at 0.1 rad/s]/[Viscosity at 100 rad/s] of the target polyethylene measured at 190° C. is greater than 8.

14. The film of claim 6, wherein tan delta at 0.1 rad/s of the target polyethylene measured at 190° C. is less than 4.

15. The film of claim 6, wherein melt strength of the target polyethylene measured as the plateau force (cN) at 190° C. is greater than 5.

16. The film of claim 6, wherein the gpcBR of the target polyethylene is greater than 0.03.

* * * * *